Aug. 19, 1930.  J. T. DOYLE  1,773,524
CINEMATOGRAPHIC PROJECTING APPARATUS
Filed July 9, 1928
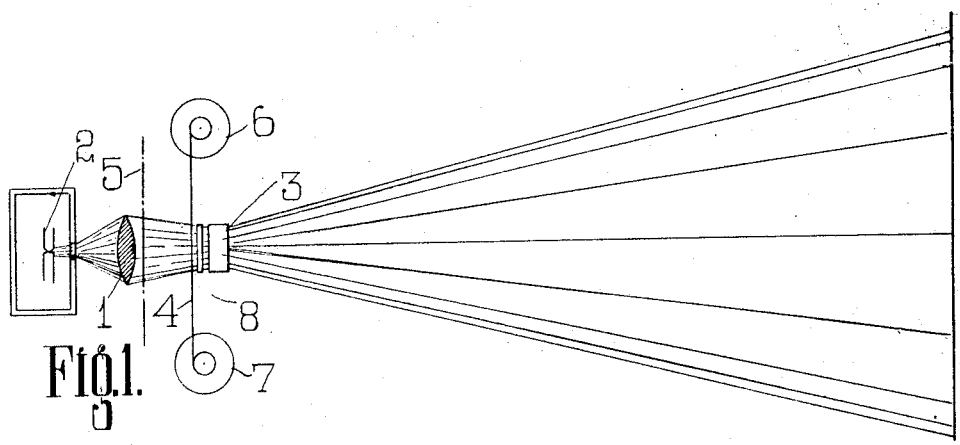
Fig.1.
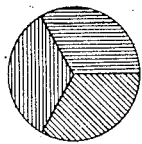  
Fig.2.  Fig.3.
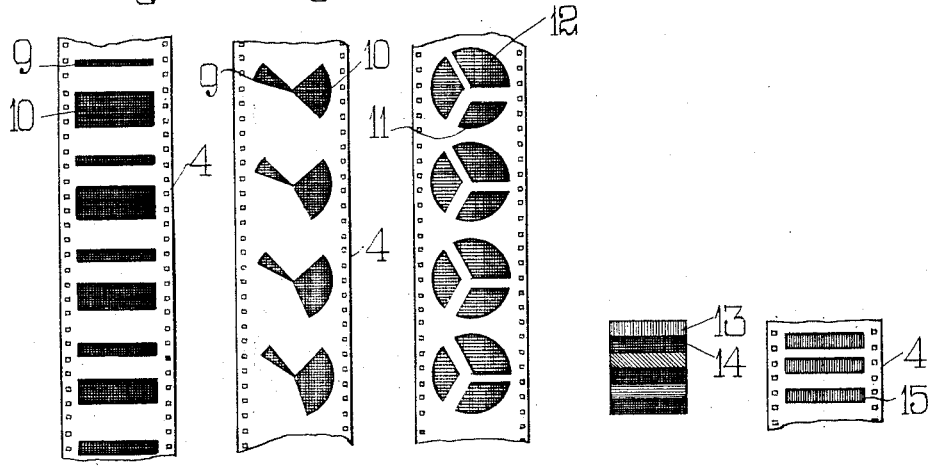
Fig.4.  Fig.5.  Fig.6.  Fig.7.  Fig.8.
Inventor:
James Thomas Doyle,
By
Sturtevant F. Mason,
Attorneys.

Patented Aug. 19, 1930

1,773,524

UNITED STATES PATENT OFFICE

JAMES THOMAS DOYLE, OF DUBLIN, IRELAND

CINEMATOGRAPHIC PROJECTING APPARATUS

Application filed July 9, 1928, Serial No. 291,335, and in Great Britain July 22, 1927.

The present invention relates to the projection of "colour music" from cinematographic apparatus.

"Colour music" consists of rays of light of changing colour projected on to a suitable screen. The rate of change and the variation of colour constitute the "music".

Hitherto, in the projection of such coloured lights, it has been usual to arrange a number of separate sources with the appropriate colour filters, in conjunction with a key board and switch mechanism which enables the operator to project any combination of colours at will. In the present invention the colour and intensity of the light projected is controlled by a suitable film adapted to replace the ordinary film in cinematographic apparatus.

Such an effect may be produced by colouring the actual film with the appropriate designs and colours and then running it through a projecting machine in the ordinary way. The difficulties of reproduction of copies of such films would be great. The present invention renders a coloured film unnecessary. A colour filter or filters interposed between the source of light and the projecting lens are masked or unmasked by opaque or semi-opaque portions of the moving film, according to the colour and intensity of the light it is desired to project.

The invention is more fully described with reference to the accompanying drawings:—

Figure 1 shows the general arrangement of the projection apparatus.

Figures 2 and 3 show colour screens for use according to the invention.

Figures 4, 5 and 6, show examples of the manner in which the opaque portions of the films are arranged.

Figures 7 and 8 show the colour screen and film of a modified arrangement.

Referring to the general arrangement of the apparatus shown in Figure 1 a condensing lens 1 throws an intense beam of white light from the arc or other source of light 2, on to the projecting lens and shutter mechanism 3. The special film, having suitably arranged opaque and transparent sections is arranged nearer to the projection lens than is usual with ordinary films, which are ordinarily arranged in or about the position 5. The film may be wound on or off spools or rolls 6 and 7 as in known apparatus. Between the film and the projecting lens is arranged a colour filter or screen 8 containing colour filters for each of the three primary colours, red, green and blue. These filters may be arranged as sectors in a circular disc (Figure 2) or any suitable manner. The colour filters are so arranged relative to the optical system of the projector that the light passing through any sector completely fills the screen on which the light is projected i. e., the portions of the beam overlap or coincide on the screen.

It is obvious that the combination of the three primary colours on the screen will produce white light and that by the subtraction of any particular coloured component by obscuring or masking a portion of one or more of the filters, any shade or intensity of colour may be projected on to the screen. The proportion and intensity of any of the primary colours present in the projected beam is controlled by the opaque, semi-opaque or transparent sections of the moving film.

Figure 5 shows an example of a portion of a film adapted for use with filter screen containing three filters, one for each primary colour, arranged as sectors of a circular disc. The opaque portions of the film also form sectors of the appropriate size. The action of the film is as previously described. The opaque sector 10 obscures a certain portion of the filter which it comes opposite, and this produces a corresponding change in the projected light. In the same way the smaller sector 9 removes a certain proportion of a component of a different colour from the beam, causing a further change in the colour of the light projected on to the receiving screen.

If a colour filter with vertically arranged panels as shown in Figure 3 is used, the opaque and transparent sections of the film are arranged correspondingly, to obscure the requisite portion of each filter. A film with the opaque portion arranged in this manner is shown in Figure 4.

The colour and intensity of the projected light is controlled by the size and position of the opaque portions of the film, and in order to vary the colour and intensity of the transmitted light the opaque or semi-opaque portions are changed in size and position relative to the colour filter, from point to point along the film.

The type of film shown in Figure 6 is applicable using the fixed, tri-colour filter of Figure 2. In this modification the opaque or semi opaque sectors subtend similar angles to the colour filters but are displaced radially as shown at 11 and 12 in order to allow the requisite amount of light to pass through the filter. The relative displacement of these sectors will change from point to point along the film, so varying the composition of the light transmitted.

The tri-colour disc or filter screen may be replaced by a screen having alternate opaque and transparent coloured sections 13 and 14 as shown in Figure 7. The moving film (Figure 8) has the opaque portions 15 which obscure the colour filters, so arranged, relatively to the colour filter, that the proportion of light required of each colour, is transmitted. If the opaque portion of the film masks the whole of that particular colour filter which it controls, then that colour is absent from the projected beam. If the opaque portion of the film coincides with the opaque section of the colour filter, then the whole of filter is in use. Hence, by adjusting the position of the opaque band on the film, any desired quantity of light can be projected. The other two colours are controlled in a similar manner. The advantage of such an arrangement is that the opaque portions of the film are of unvarying size, and to vary the colour of the light projected only the position of the opaque portions relative to the colour filters need be changed.

I declare that what I claim is:—

1. Apparatus for projecting light of varying colour comprising in combination a source of white light, a projecting lens colour filters arranged between said light and said lens, said colour filters arranged as sectors of a disc, a flexible translucent film including opaque areas arranged as sectors of a circle spaced correspondingly to the proportion of said colour filters it is desired to mask, and means to displace said film relatively to said colour filters.

2. Apparatus for projecting light of varying colour comprising in combination a source of white light, a projecting lens, colour filters arranged between said source of light and said lens, said colour filters arranged as sectors of a disc, a flexible translucent film including opaque areas arranged as sectors of a disc subtending similar angles to said colour filters but radially displaced according to the proportion of said corresponding colour filters it is desired to mask, and means to displace said film relatively to said colour filters.

3. Apparatus for projecting light of varying colour comprising in combination a source of white light, a projecting lens, colour filters arranged between said source of light and said lens, opaque areas of substantially similar size arranged alternately with said colour filters, a flexible translucent film including opaque sections of unvarying size, spaced correspondingly to the proportion said colour filters which it is desired to mask, and means to displace said film relatively to said colour filters.

4. Apparatus for projecting light of varying colour comprising in combination a source of light, a projecting lens, a fixed uniplanar system of colour filters between said lens and said light, said colour filters being all arranged within the field of said projecting lens, a flexible translucent film including opaque areas spaced correspondingly to the portions of said colour filters it is desired to mask, and means to displace said film relatively to said colour filters.

5. Apparatus for projecting light of varying colour comprising in combination a source of white light, a projecting lens, a fixed coplanar system of colour filters between said projecting lens and said light, one of said colour filters being transparent to light substantially red, one transparent to light substantially green and one transparent to light substantially blue, said colour filters being simultaneously within the field of said projecting lens, a flexible translucent film including opaque areas spaced correspondingly to the portions of said colour filters it is desired to mask, and means to displace said film relatively to said colour filters.

6. A method of projecting light to produce color effects which consists in producing a beam of white light, selectively obstructing the passage of light of different colors in different portions of said beam, selectively modifying the amount of light in each of said portions, and projecting the obstructed and modified parts of the beam in overlapping relation onto a screen.

In witness whereof, I have hereunto signed my name this 25th day of June, 1928.

JAMES THOMAS DOYLE.